United States Patent
Watanabe

(10) Patent No.: US 7,606,209 B2
(45) Date of Patent: Oct. 20, 2009

(54) INFORMATION PROCESSING DEVICE AND PROGRAM

(75) Inventor: Hiroyuki Watanabe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 805 days.

(21) Appl. No.: 10/806,427

(22) Filed: Mar. 23, 2004

(65) Prior Publication Data

US 2004/0246915 A1 Dec. 9, 2004

(30) Foreign Application Priority Data

Mar. 26, 2003 (JP) ............................. 2003-085667

(51) Int. Cl.
*H04W 4/00* (2009.01)
(52) U.S. Cl. ...................... 370/338; 370/329
(58) Field of Classification Search ................. 370/310, 370/313, 331, 400, 319, 320, 321, 327, 342, 370/350, 322, 329, 332, 402, 401, 403; 455/422.1, 455/450, 456.3, 456.5, 502, 403, 414, 418, 455/419, 422, 436, 504, 509, 511, 432.1; 340/825.44, 825.36, 825.37, 825.38, 825.39, 340/825.49
See application file for complete search history.

(56) References Cited

U.S. PATENT DOCUMENTS

| | | | | |
|---|---|---|---|---|
| 5,654,959 A | * | 8/1997 | Baker et al. | 370/331 |
| 5,745,481 A | * | 4/1998 | Phillips et al. | 370/313 |
| 5,825,817 A | * | 10/1998 | Tanaka et al. | 375/228 |
| 5,839,075 A | * | 11/1998 | Haartsen et al. | 455/450 |
| 5,914,668 A | * | 6/1999 | Chavez et al. | 340/7.39 |
| 6,144,855 A | * | 11/2000 | Slovin | 455/432.1 |
| 6,181,878 B1 | | 1/2001 | Honda | |
| 6,640,115 B1 | * | 10/2003 | Fujimoto et al. | 455/567 |
| 7,039,424 B2 | * | 5/2006 | Gorsuch | 455/456.3 |
| 7,042,852 B2 | * | 5/2006 | Hrastar | 370/310 |
| 7,054,627 B1 | * | 5/2006 | Hillman | 455/422.1 |
| 7,054,927 B2 | * | 5/2006 | Ulrich et al. | 455/422.1 |
| 2003/0235164 A1 | * | 12/2003 | Rogers et al. | 370/331 |
| 2004/0030808 A1 | | 2/2004 | Okaue et al. | |
| 2004/0037247 A1 | * | 2/2004 | Ngo | 370/332 |

(Continued)

FOREIGN PATENT DOCUMENTS

CN 1171704 A 1/1998

(Continued)

OTHER PUBLICATIONS

JPO Notification of Reasons for Rejection, mailed Jun. 28, 2005, in Japanese Patent Application No. 2003-085667 (5 pages including English translation).

(Continued)

*Primary Examiner*—Aung S Moe
*Assistant Examiner*—Abdullah Riyami
(74) *Attorney, Agent, or Firm*—Finnegan, Henderson, Farabow, Garrett & Dunner, L.L.P.

(57) ABSTRACT

In an information processing device having a communication function of performing a network connection via a wireless relay apparatus, the information processing device comprises a first unit which finds the wireless relay apparatus, and a second unit which displays information, which is characterized according to identification information of the wireless relay apparatus when the first unit finds the wireless relay apparatus.

10 Claims, 7 Drawing Sheets

U.S. PATENT DOCUMENTS

| | | | |
|---|---|---|---|
| 2004/0043767 A1* | 3/2004 | Tsutsumi et al. | 455/432.1 |
| 2004/0068653 A1* | 4/2004 | Fascenda | 713/168 |
| 2004/0090929 A1* | 5/2004 | Laux et al. | 370/311 |
| 2004/0203416 A1* | 10/2004 | Hata et al. | 455/67.7 |
| 2004/0203804 A1* | 10/2004 | Merwe | 455/446 |
| 2005/0018686 A1* | 1/2005 | Igarashi et al. | 370/395.2 |
| 2005/0159107 A1* | 7/2005 | Mauney et al. | 455/41.2 |
| 2005/0170852 A1* | 8/2005 | Li et al. | 455/456.5 |
| 2005/0221846 A1* | 10/2005 | Jansen | 455/502 |
| 2006/0014528 A9* | 1/2006 | Hsu et al. | 455/414.1 |
| 2006/0039450 A1* | 2/2006 | Fulton et al. | 375/133 |
| 2007/0093201 A1* | 4/2007 | Hsu et al. | 455/3.04 |
| 2007/0184846 A1* | 8/2007 | Horton et al. | 455/456.1 |
| 2009/0092070 A1* | 4/2009 | Mahany et al. | 370/311 |

FOREIGN PATENT DOCUMENTS

| | | |
|---|---|---|
| CN | 1394452 A | 1/2003 |
| EP | 0597638 A1 | 5/1994 |
| EP | 0874529 A2 | 10/1998 |
| GB | 2328845 A | 3/1999 |
| JP | 10-89980 | 4/1998 |
| JP | 2002-165249 | 6/2002 |
| JP | 2002-197109 | 7/2002 |
| JP | 2002-291028 | 10/2002 |
| JP | 2004-5635 | 1/2004 |
| KR | 2002-40594 | 5/2002 |
| KR | 2002-76176 | 10/2002 |
| TW | 310407 | 7/1997 |
| TW | 518467 | 1/2003 |

OTHER PUBLICATIONS

Communication from European Patent Office mailed Sep. 26, 2005, in European Patent Application No. 04006859.5-2416 PCT/.

Notification of the First Office Action mailed on Mar. 10, 2006, from Chinese Patent Office in Chinese Patent Application No. 2004100312989.

Notice Requesting Submission of Opinion mailed on Mar. 29, 2006, from the Korean Patent Office in Korean Patent Application No. 10-2004-0020938.

Office Action dated Apr. 26, 2007, from Taiwanese Patent Office in Taiwanese Patent Application No. 93107333.

* cited by examiner

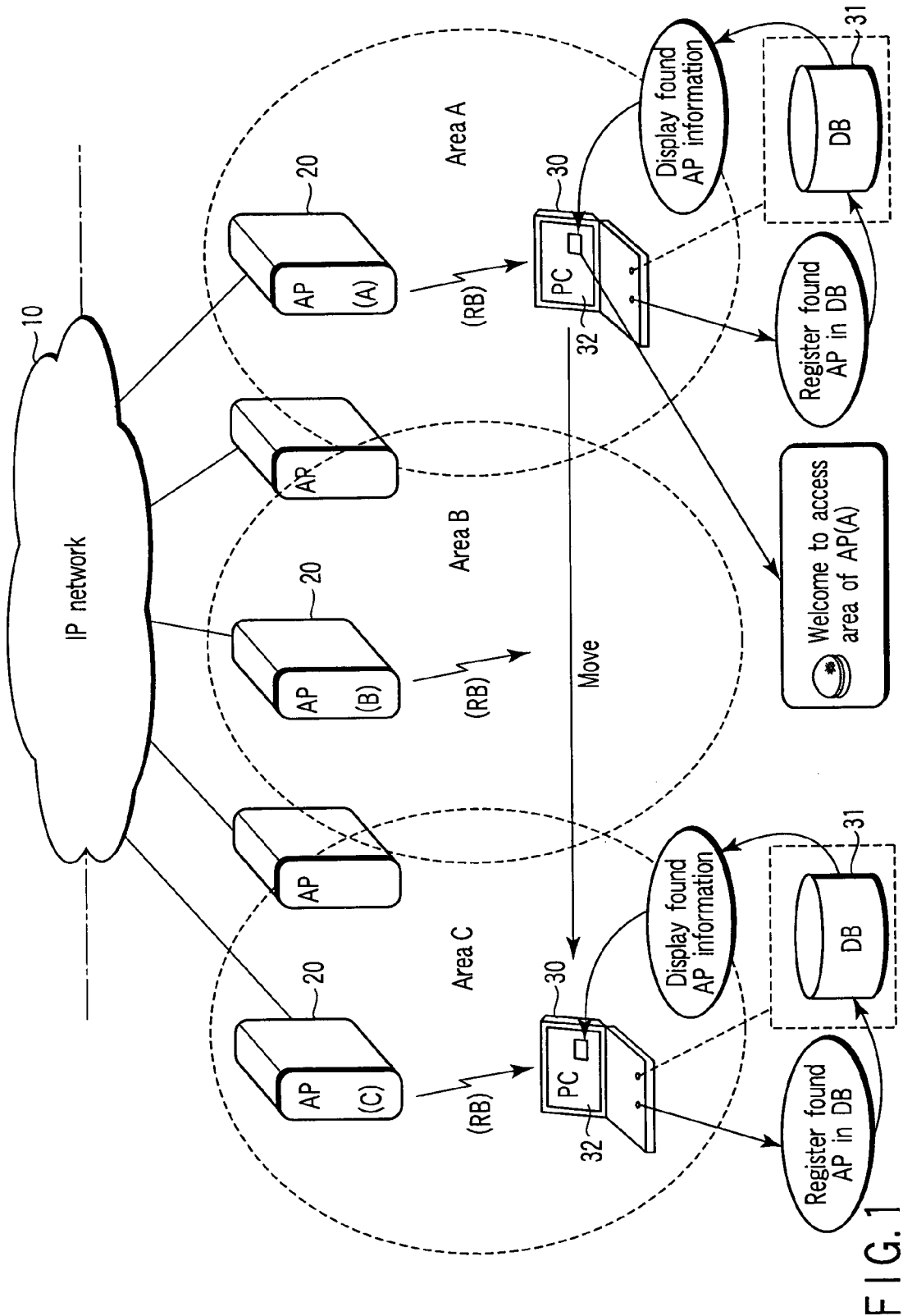
F I G. 1

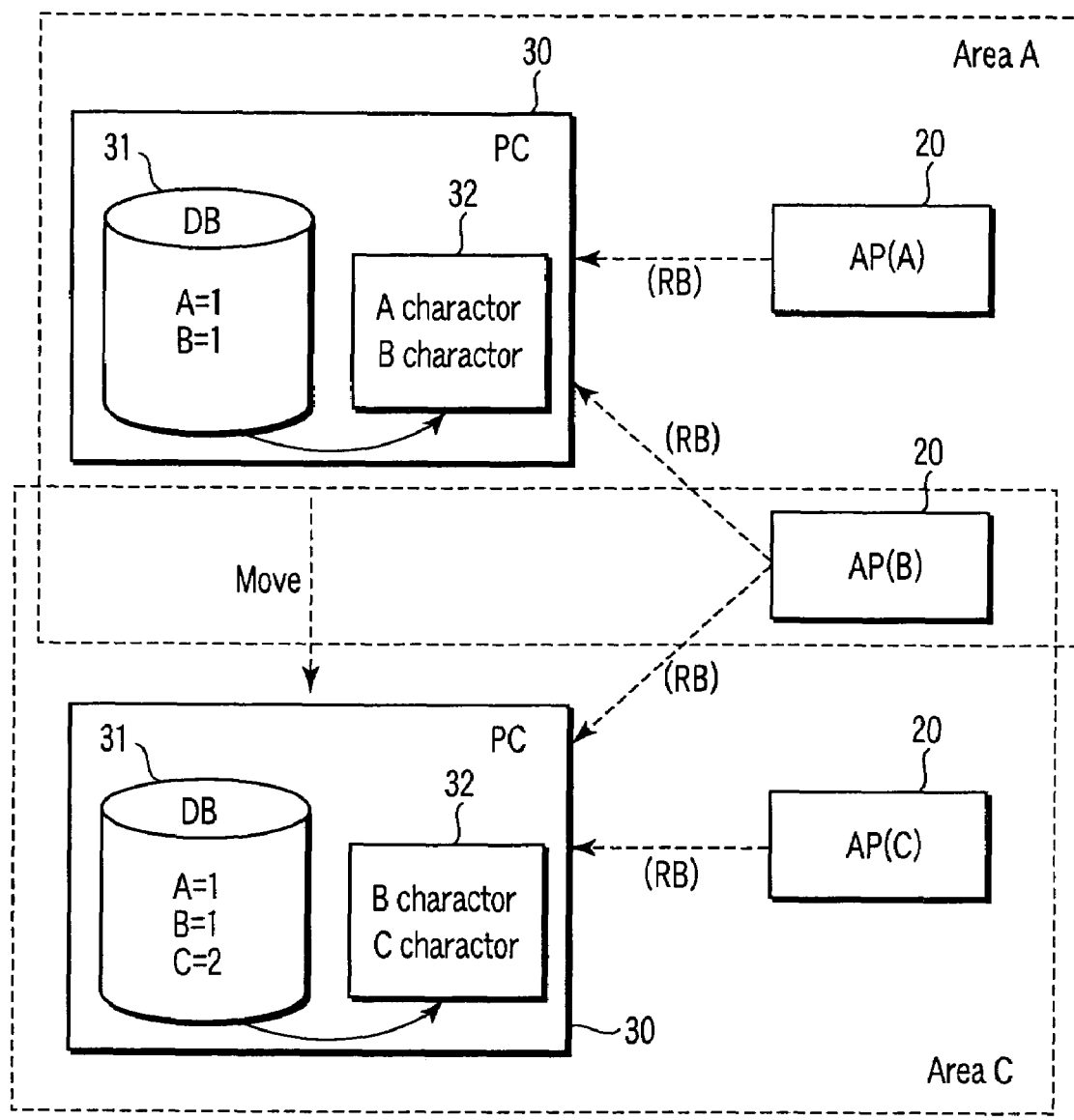
F I G. 2

INFORMATION PROCESSING DEVICE AND PROGRAM

CROSS-REFERENCE TO RELATED APPLICATIONS

This application is based upon and claims the benefit of priority from prior Japanese Patent Application No. 2003-085667, filed Mar. 26, 2003, the entire contents of which are incorporated herein by reference.

BACKGROUND OF THE INVENTION

1. Field of the Invention

The present invention relates to an information processing device having a wireless communication function. In addition, the present invention relates to a program suitable for applying to a small electronic equipments such as a notebook-type personal computer and a PDA, etc., which are easy to carry and which have a wireless communication function.

2. Description of the Related Art

In general, an information processing device such as a personal computer comprises a network device such as a wired LAN device. The network device is used to connect the information processing device with the network. By connecting the information processing device with the network such as Internet, it becomes possible to acquire information from other computers on the network, and share the information between other computers. Many computers use operating systems which support the network connection function. With this configuration, even if the user does not have technical knowledge concerning the network, the information processing device can be easily connected with the network such as Internet.

Recently, the small information processing equipments such as notebook-type personal computers and PDA have a function of finding access points of the wireless LAN which exist in the surroundings under the system requirements, and performing a connection with the network (For instance, see Japanese Patent Application KOKAI Publication No. 10-89980).

These equipments find an access point which is communicable first when performing connection with the access point of the wireless LAN, and performing connection thereafter. However, in this case, a found ID and type, etc. of the access point cannot be easily identified.

BRIEF SUMMARY OF THE INVENTION

An aspect of the present invention provides an information processing device and a program in which a type etc. of a found access point can be easily identified and informed to the user when the access point is found. Another aspect of the present invention provides an information processing device and a program which expands a useful function by recording and controlling the found access point.

An information processing device, having a communication function of performing a network connection via a wireless relay apparatus, according to an aspect of the present invention, is characterized by comprising: a first unit which finds the wireless relay apparatus; and a second unit which displays information, which is characterized according to identification information of the wireless relay apparatus when the first unit finds the wireless relay apparatus. The present invention can also be achieved by method, computer program and the like.

According to the present invention, for instance, in the portable information processing equipment, when finding, for instance, the access point of wireless LAN, which configures the wireless relay apparatus (when receiving the beacon sent from the access point) under the system requirements which does not specify the place, the identification information (for instance, SSID, BSSID, etc.) of the found access point is gathered under a predetermined condition and the finding frequency is updated. When finding the access point, for instance, the various messages can be displayed according to the finding frequency of the access point. In addition, as an extension of the function, it is possible to provide a function that the communication environment in the use place can be easily set based on the displayed information.

BRIEF DESCRIPTION OF THE SEVERAL VIEWS OF THE DRAWING

FIG. 1 is a block diagram which shows a configuration of the entire network system to explain an outline of a function of an information processing device according to the embodiments of the present invention;

FIG. 2 is a figure to explain an operation of the information processing device under the communication environment shown in FIG. 1 according to the embodiments;

DETAILED DESCRIPTION OF THE INVENTION

Figure 3:
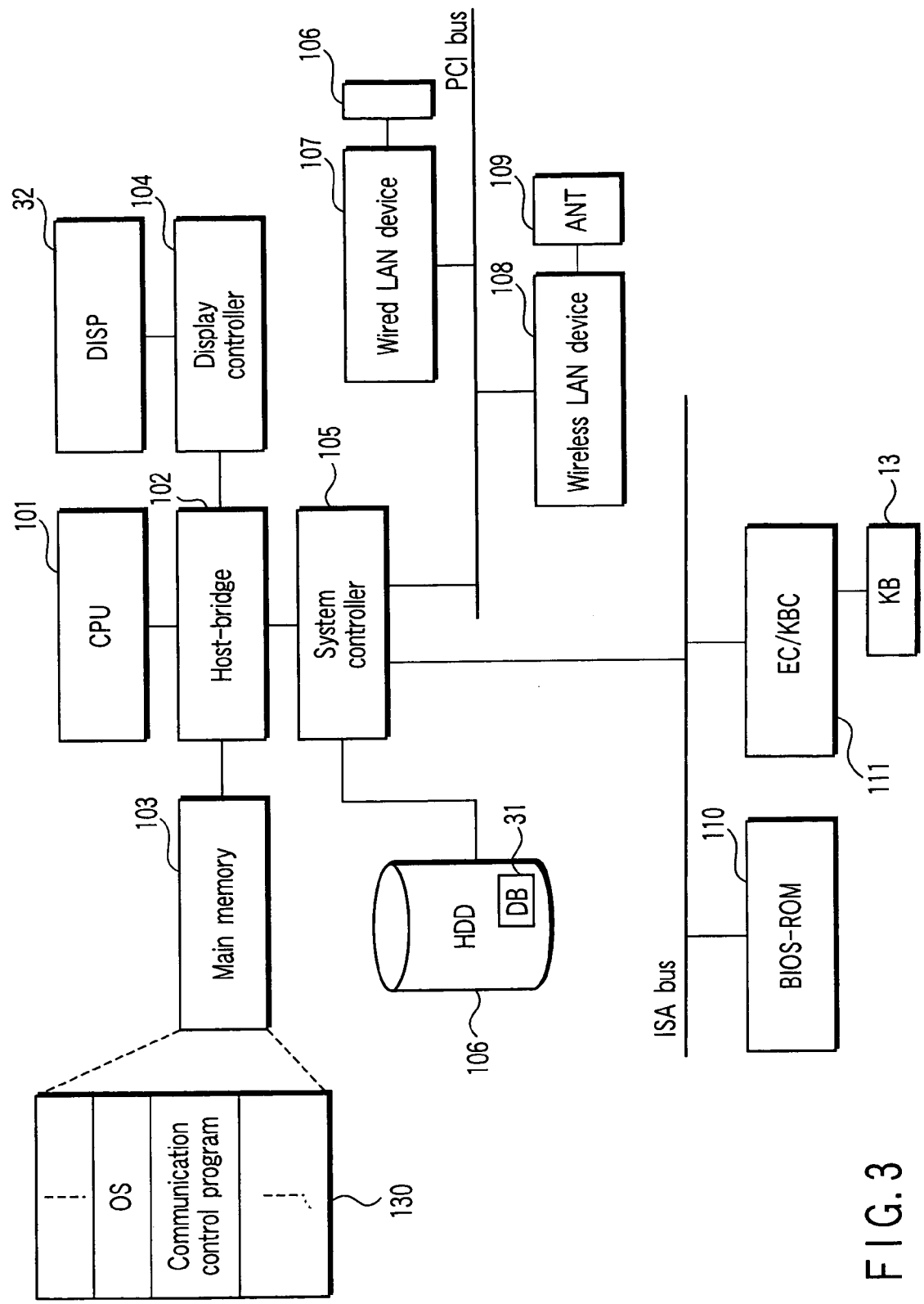
FIG. 3 is block diagram which shows a configuration of the information processing device according to the embodiments.

Hereinafter, embodiments of the present invention will be explained referring to the drawings.

FIG. 1 is a figure which shows an example of a system configuration to explain an outline of a function of an information processing device according to the embodiment of the present invention. FIG. 2 is a figure which shows an operation example of a terminal under a communication environment in the system configuration shown in FIG. 1.

The wireless LAN access areas A, B, and C each constitutes the communication network through the IP network 10 as shown in FIG. 1. The servers such as the printers, networks, and files and the wirelesses LAN access points (AP) 20 are provided to the wireless LAN access areas A, B, and each C.

The terminal which is defined as the client is achieved by, for instance, the portable personal computer (PC) 30. The personal computer 30 has the communication function of performing the network connection with the arbitrary equipments via the above-mentioned various servers and, furthermore, the IP network 10 by being connected with the access point 20 in the wireless LAN access area by the wireless LAN.

According to the embodiment of the present invention, as shown in FIG. 2, when the personal computer 30 finds the access points 20 of the wireless LAN access areas A, B, and C, the personal computer 30 gathers the identification information on the found access point 20 under a predetermined condition (SSID and BSSID, etc.). Then, the personal computer 30 updates and controls the finding frequency of the found access point 20 on the database (DB) 31, and displays, for instance, various messages on the display unit 32 according to the finding frequency of the access point. The SSID (extended service set identity) is an ID (identification information) for grouping the access points etc. The BSSID (basic service set identity) is an ID for authenticating the communication terminal etc. in the MAC layer. The SSID and BSSID can be recognized by receiving the beacons (RB) sent from the access points 20, respectively.

The apparatus according to the first embodiment of the present invention has the following configuration. The display information for informing the user of the state (furthermore, for setting the found access point 20 to the usable environment) is made to a predetermined form and is prepared (held), when the access point 20 is found (i.e., when the beacon (RB) sent from the access point 20 is received). And, when the access point 20 is found, for instance, the specific character (information window) as shown in FIG. 1, which can easily recognize the type of the access point prepared beforehand is displayed during the predetermined time period. In addition, the specific character is characterized and displayed according to the finding frequency of the access point in this case. For instance, the size and the color etc. of the display character are changed according to the finding frequency of the access point. Or, two or more different characters are provided for each stages corresponding to the finding frequency of the access point, and the character to be displayed is switched according to the finding frequency of the access point and is presented to the user. In addition, it becomes possible to set the optimal communication profile which suits the current communication environment along with the corresponding icon operation by defining the display character as an operation icon.

The device according to the second embodiment of the present invention has the following configuration. The database (DB) 31 storing the information associated with the access points 20, respectively, which can be found by the personal computer 30 is down-loaded to a predetermined storage area beforehand through the communication network. Then, when access point 20 is found, information associated with the access point 20 is acquired from the database 31 and the corresponding information according to the finding frequency of the above-mentioned access point is characterized and displayed during the predetermined time period. For instance, when receiving the beacons (RB) from the access point (A) 20 in the wireless LAN access area A, service information corresponding to the finding frequency of the corresponding access point (A) 20 is displayed. And, when receiving the beacons (RB) 20 from the access point (B) in the wireless LAN access area B, the peculiar advertisement information of the corresponding access point (B) 20 is displayed. When receiving the beacon (RB) from access point (C) 20 in the wireless LAN access area C, if, for instance, the finding frequency of the corresponding access point (C) 20 is more than a predetermined values it is judged whether a day is a birthday when the user has been registered beforehand. When the day is the birthday, information of presentation and introduction etc. of birthday message and birthday present are displayed during the predetermined time period. In addition, associating with, for instance, the above-mentioned finding frequency, information of a service according to a time zone, morning/afternoon, week, day of the week, season, period, birthday, and weather, etc., and the sale guide etc. are displayed during the predetermined time period.

The finding frequency of the access point may be updated (incremented) by, for instance, the following any cases.

(1) At predetermined time intervals (for instance, every 30 minutes and every 1 hours, etc.) under the operation mode in which the beacon (RB) from the access point 20 can be received;

(2) When there is no change during a predetermined time period when the reception environment of beacon (RB) changes;

(3) At predetermined time intervals (for instance, every ten minutes etc.) by specifying the time zone, and (4) Under other conditions.

Next, the system configuration of the above-mentioned personal computer 30 will be explained referring to FIG. 3.

As show in FIG. 3, the personal computer 30 comprises a CPU 101, host bridge 102, main memory 103, display controller 104, system controller 105, hard disk drive (HDD) 106, wired LAN device 107, wireless LAN device 108, BIOS-ROM 110, and embedded controller/keyboard controller IC (EC/KBC) 111 etc.

The CPU 101 is a processor provided to control the operation of the computer, and executes the operating system (OS) and various application programs/utility programs loaded from the hard disk drive (HDD) 106 on the main memory 103. Moreover, the CPU 101 executes a BIOS (Basic Input Output System) stored in the BIOS-ROM 110. The CPU 101 executes a communication control program 130 stored in the main memory 103 according to a predetermined set condition (For instance, at constant time intervals), and executes the application processing (see FIG. 5 and FIG. 7) regarding to the communication service shown in FIG. 5 (the first embodiment) or FIG. 7 (the second embodiment) described later in details.

A communication control program 130 is installed to the personal computer 30 beforehand as one of utility programs. This communication control program 130 controls the communication of the corresponding computer, and comprises, for instance, a function to register and store a network setting environment in each use place, such as a house and offices, where the communication environments are different from each other as a communication profile, a function to automatically set a network to an optimal communication environment by using the above-mentioned communication profile, and a function to automatically switch to a wireless network by disconnecting a cable under a wired network connection state. Here, as the above-mentioned communication profile, the following items are selectively settable according to the communication environment to be used:

Profile name,

Comment on profile,

Icon,

Capture item (Internet setting; proxy setting, and start home page, etc., device; wired network device, wireless network device, and infrared device etc., TCP/IP setting; DHCP, IP address, subnet mask, default gateway, DNS server, and WINS server, etc.), and Start program after switching.

In addition, the communication control program 130 has an application function (see FIG. 5 and FIG. 7) concerning the communication service to memorize and control the finding frequency of communicatable each access point 20, and a function to display various information items concerning the use of each found access point in the display form (which is characterized according to the finding frequency) according to the finding frequency of the corresponding access point 20 at a predetermined time period when the find access point 20 is found. In this case, when the wireless LAN device 108 receives the beacon (RB) from the access point 20, the wireless LAN device 108 acquires the identifier (BSSID/SSID) of the access point 20 where the beacon (RB) has been received. The wireless LAN device 108 registers the found access point 20 (where beacon (RB) is received) on the database (DB) 31, counts the finding frequency of each registered access point 20, and manages the finding frequency on the database 31. This database 31 is managed on the HDD 106 by the communication control program 130. In addition, when the access point 20 is found, the finding frequency of the found access point 20 is acquired from the above-mentioned database 31 in the first embodiment of the present invention. The specific character (One example is shown in FIG. 1) prepared beforehand is characterized according to the finding frequency of the access point (by changing the font size and the color, etc.) and is displayed on the display unit 32 during the predetermined time period. In the first embodiment, it is assumed that the communication control program 130 includes the processing routine which creates the above-mentioned specific character. The communication control program 130 which contains the application function according to the communication service can be treated as an individual program.

The host bridge 102 is a bridge device which connects between the local bus of the CPU 101 and the system controller 105. The host bridge 102 incorporates the memory controller for controlling an access of the main memory 103. The display controller 104 controls the display unit (DISP) 32 which uses, for instance, the LCD used as a display monitor of the computer.

The system controller 105 controls each device on the PCI bus and each device on the ISA bus. In addition, the system controller 105 incorporates the IDE controller to control the HDD 106. The HDD 106 memorizes the database (DB), which achieves the application function concerning the communication service and which is managed by the communication control program 130.

The wired LAN device 107 is a wired network device to connect the device with the wired network. The wired LAN device 107 communicates with the wired network through the wired LAN cable connected with the LAN connector 106.

The wireless LAN device 108 is a wireless network device to connect the device with the wireless network and has a base band unit and an RF unit. The RF unit transmits and receives the wireless signal via the antenna (ANT) 109. The wireless LAN device 108 performs the wireless communication, for instance, according to the IEEE 802.11a/IEEE 802.11 standard. In the embodiment, the wireless LAN device 108 notifies the CPU 101 when receiving the beacon (RB) sent from the access point 20.

The embedded controller/keyboard controller IC (EC/KBC) 111 is a one-chip microcomputer in which the embedded controller for the electric power control and the keyboard controller to control the keyboard 13 are integrated. The embedded controller/keyboard controller IC (EC/KBC) 111 has a function of performing the power-on/power-off of the computer according to the operation of the power button by the user.

Figure 4:
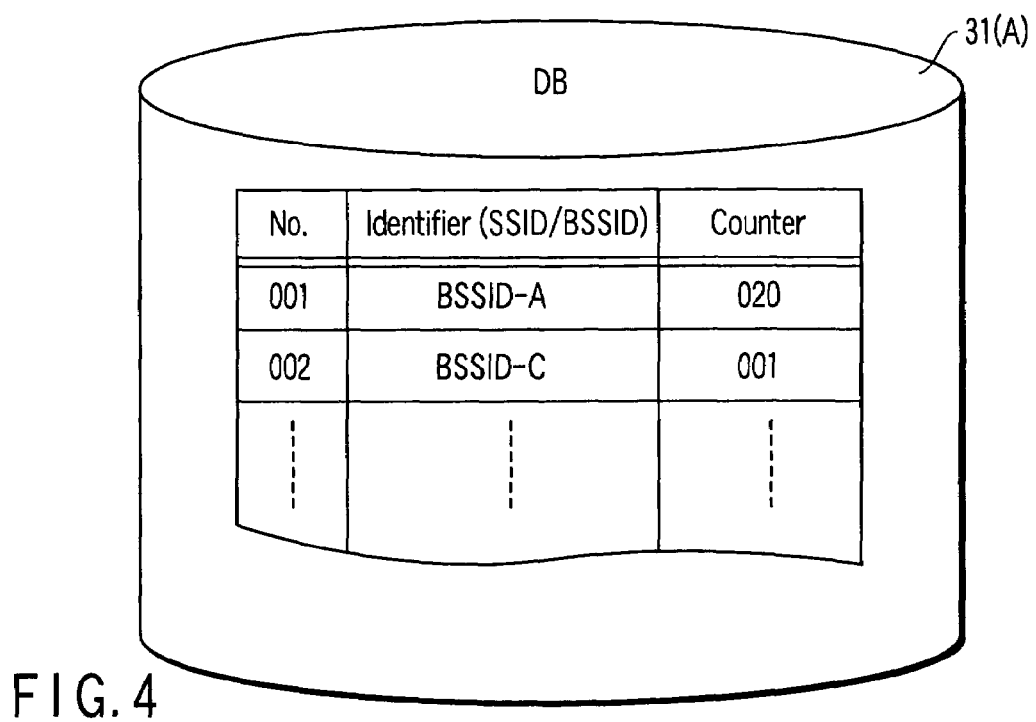
FIG. 4 is a figure which shows a configuration of a database according to the first embodiment of the present invention.

FIG. 4 shows a configuration of the database 31 managed by the communication control program 130 according to the first embodiment of the present invention. The database according to the first embodiment is shown with a reference numeral of 31 (A). In the first embodiment, an identifier (SSID/BSSID) of the found access point 20 and the finding frequency (counter) are associated and memorized in the database 31 under the control of the CPU 101, and are managed by the management number (No.). A specific character for presenting the found access point 20 to the user is generated by the software processing by the communication control program 130 as mentioned above. A plurality of character data corresponding to finding frequency may be memorized in the main memory 103 or the HDD 106 beforehand.

Figure 5:
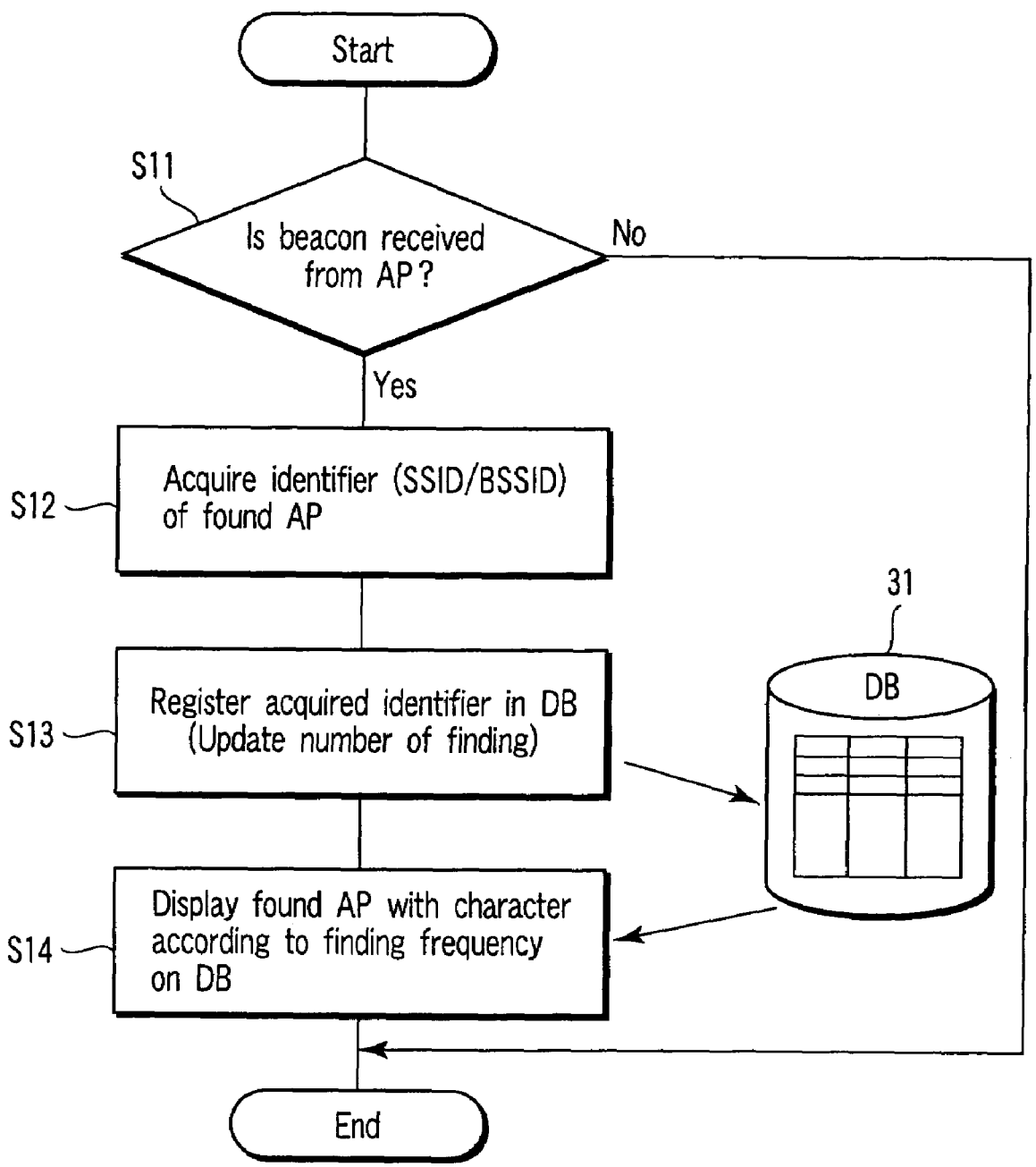
FIG. 5 is a figure which shows a processing procedure of an application concerning the communication service according to the first embodiment.

FIG. 5 shows the processing procedure in the first embodiment of the application processing according to the communication service in the communication control program 130.

In the application processing concerning the communication service in the first embodiment, the CPU 101 executes the application processing concerning the communication service shown in FIG. 5 which is included in the above-mentioned communication control program 130 at a predetermined time intervals. In this processing, when the wireless LAN device 108 receives the notification of receiving the beacon (RB) sent from the access point 20 in a certain wireless LAN access area (for instance, wireless LAN access area A) (step S11 of FIG. 5), the CPU 101 acquires the identifier (SSID/BSSID) of the found access point 20 according to the corresponding beacon (RB) (step S12 of FIG. 5). If the identifier of the corresponding access point 20 has already been registered in the database 31 (A) shown in FIG. 4, the counter of the access point 20 is incremented and the finding frequency is updated. On the other hand, if the identifier (SSID/BSSID) of the found access point 20 is not registered in the database 31 (A), the identifier of the found access point 20 is registered in the database 31 (A). In this case, the finding frequency "1" is set to the counter which counts the finding frequency (step S13 of FIG. 5).

In addition, when the access point 20 is found, the CPU 101 characterizes, for instance, the specific character shown in FIG. 1 prepared beforehand according to the count value of the database 31 (according to the finding frequency of the access point) and displays the character on the screen of the display unit 32 at a constant time period (step S14 of FIG. 5). For instance, the size of the display character (for instance, information window) is changed step by step according to the finding frequency of the access point. Or, the display color of the display character is changed step by step according to the finding frequency of the access point. Or, different characters in each of two or more steps corresponding to the finding frequency of the access point are prepared, and the characters to be displayed are switched according to the finding frequency of the access point. In addition, the displayed character is defined as an operation icon, and supports the switching of the setting to the optimal communication profile which suits a current communication environment along with the operation of the corresponding icon.

Figure 8A:
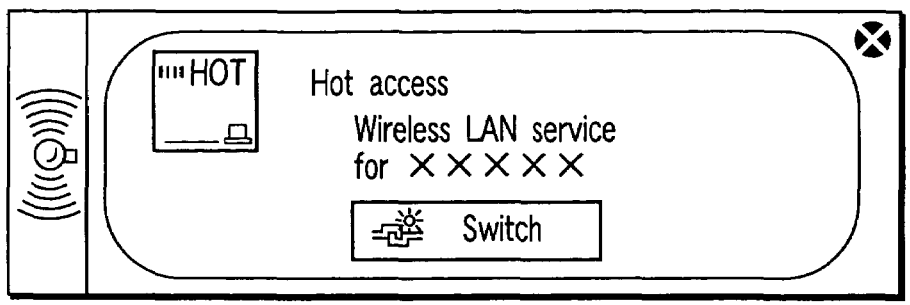
FIG. 8A and FIG. 8B are figures which show configuration examples of a character according to each of above-mentioned embodiments.
Figure 8B:
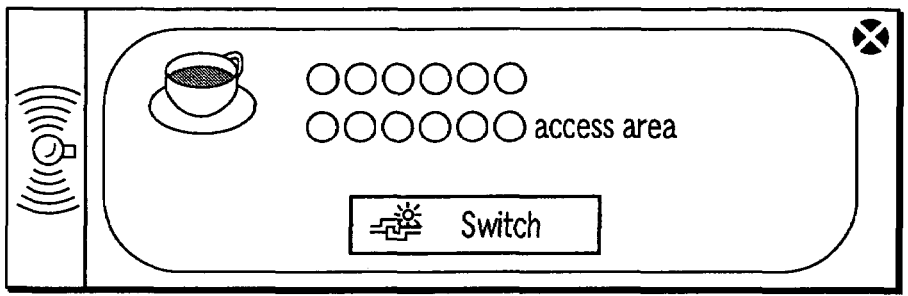
Figure 9A:
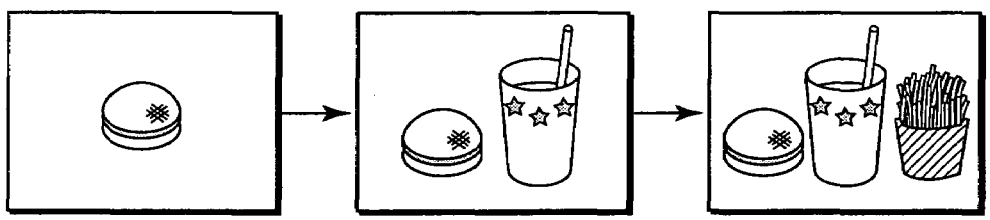
FIG. 9A and FIG. 9B are figures which show a configuration example of a character according to each of above-mentioned embodiments.
Figure 9B:
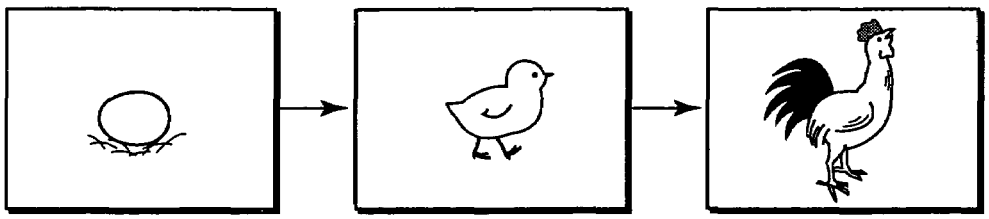

With the application processing function according to such communication service, in each communication environment area to be used usually, the current communication environment and various service information, etc. can be provided to the user before the network connection, in addition, it is also possible to present original information individually in each wireless LAN access areas A, B, and C by changing the set finding frequency for each wireless LAN access areas A, B, and C. An example is shown in FIG. 8A and FIG. 8B. In this example, the switch operation button is provided to the information window, and when the switch operation button is clicked, the switching to the profile of the service provider is started. The example of providing different characters step by step is shown in FIG. 9A and FIG. 9B according to the finding frequency of the access point 20. FIG. 9A is an example when service information is changed step by step according to the finding frequency of the access point 20. FIG. 9B is an example of the character which grows up according to the finding frequency of the access point 20.

Figure 6:
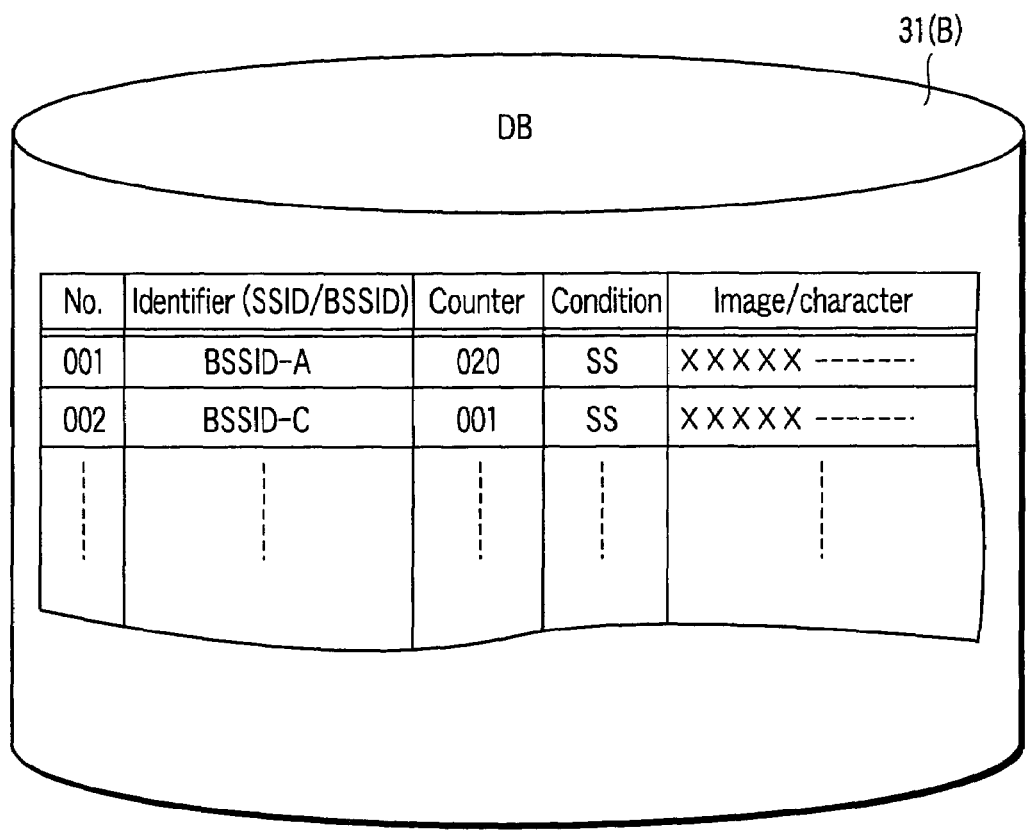
FIG. 6 is a figure which shows a configuration example of a database according to the second embodiment of the present invention.

The second embodiment of the present invention will be explained referring to FIG. 6 and FIG. 7. In the second embodiment, the above-mentioned personal computer 30 downloads the database 31 to achieve the application function concerning the communication service to the predetermined storage area beforehand through the above-mentioned communication network for above-mentioned each of wireless LAN access areas A, B, and C or specific wireless LAN access areas which are communicable. When finding the access point 20 in the wireless LAN access area, the personal computer 30 acquires information associated with the access point 20 from the above-mentioned database 31, and characterizes the corresponding information according to the finding frequency of the above-mentioned access point and displays it during the predetermined time period. In the second embodiment, as shown in FIG. 6, the database 31 memorizes the condition and information setting what information is displayed at what condition, in addition, to the identifier (SSID/BSSID) and the counter, which counts the finding frequency, by associating them. The concrete example of this condition etc. will be described later.

Figure 7:
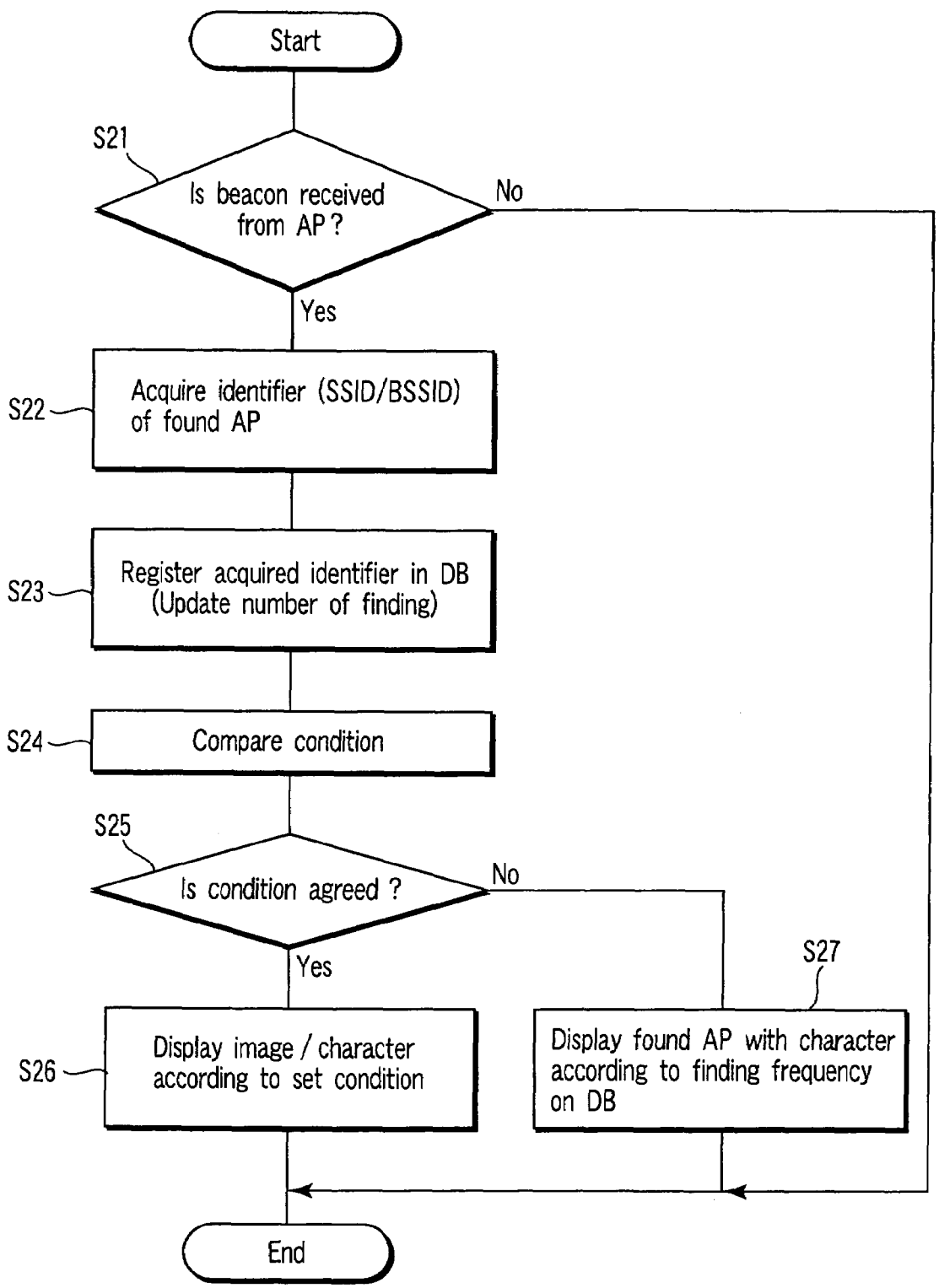
FIG. 7 is a figure which shows a procedure of an application processing relating to the communication service according to the second embodiment.

FIG. 7 shows the procedure of the application processing relating to the communication service in the second embodiment of the present invention.

In the application processing concerning the communication service in the second embodiment, when the wireless LAN device 108 receives the notification of receiving the beacon (RB) sent from the access point 20 in a certain wireless LAN access area (for instance, wireless LAN access area A) (step S21 of FIG. 7), the CPU 101 acquires the identifier (SSID/BSSID) of the found access point 20 according to the corresponding beacon (RB) (step S22 of FIG. 7). If the identifier of the corresponding access point 20 has already been registered in the database 31 (B) shown in FIG. 6, the CPU 101 increments the finding frequency and updates the counter of the access point 20 (step S13 of FIG. 5). If the identifier (SSID/BSSID) of the found access point 20 is not registered in database 31 (B), the CPU 101 invalidates the identifier of the found access point 20, or registers it to the database 31 (B) and performs the same service as that of the first embodiment.

In addition, the CPU 101 acquires the finding frequency, the condition, and the display information, etc. associated with the access point 20, if the found access point 20 is registered in the above-mentioned database 31 (B) when finding the access point 20. Then, the CPU 101 compares the conditions (step S24 of FIG. 7), characterizing the corresponding display information according to the finding frequency if the conditions are matched, and displays it on the screen of the display unit 32 during the predetermined time period (step S25 Yes of FIG. 7 and S26). For instance, when the period is set (defined) in the condition, if the present found access point 20 is within the set period, the CPU 101 characterizes the corresponding display information on the database 31 (B) according to the finding frequency and displays it on the screen of the display unit 32. The information used for the condition comparison is performed by using, for instance, the date information managed by the computer 30. The similar display as mentioned above is performed when the time zone, morning/afternoon, week, day of the week, and seasons, etc. are set. When the service type, the advertisement type, and the advertisement type, etc., corresponding to the finding frequency are set as the condition, the service information, advertisement information, and advertisement information, etc. whose display forms are changed according to the finding frequency, in addition to contents, can be displayed on the screen of the display unit 32. An example is shown in FIG. 9A and FIG. 9B, respectively. FIG. 9A is an example when the service information is changed step by step according to the finding frequency of the access point 20. FIG. 9B is an example of the character, which grows up according to the finding frequency of the access point 20. The abovementioned information presentation is an example. It is possible to provide the various information such as information concerning the maintenance, various guide information.

As mentioned above, according to the present invention, the type of the found access point etc. can be easily identified and can be informed to the user when the access point is found. In addition, the information processing device to expand a useful function by recording and controlling the found access point can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information processing device performing a network connection via a wireless relay apparatus, the device comprising:
    a finding unit configured to find the wireless relay apparatus;
    a counting unit configured to count a finding frequency of the wireless relay apparatus found by the finding unit;
    a detector configured to detect identification information of the wireless relay apparatus found by the finding unit;
    a storing unit which stores specific image data indicating characters representing identification information of the found wireless relay apparatus; and
    a displaying unit configured to display one of characters indicated by the image data stored in the storing unit and representing a character of the identification information of the wireless relay apparatus detected by the detector in a display form which is in accordance with the finding frequency counted by the counting unit.

2. The information processing device according to claim 1, wherein the storing unit stores the specific image data indicating characters and corresponding identification information of the wireless relay apparatuses.

3. The information processing device according to claim 1, wherein the storing unit stores peculiar icons or character messages.

4. The information processing device according to claim 1, wherein the displaying unit acquires service information or advertisement information for the wireless relay apparatus found by the finding unit, and displays the acquired information.

5. The information processing device according to claim 1, wherein the displaying unit judges a condition associated with the wireless relay apparatus found by the finding unit, and changes the information displayed by the displaying unit based on the judged condition.

6. The information processing device according to claim 1, wherein the displaying unit displays selectable information in accordance with the identification information, and sets connection environment using the wireless relay apparatus found by the finding unit when the corresponding information is selected.

7. The information processing device according to claim 1, wherein the displaying unit comprises an acquiring unit configured to acquire a database associating each identification information of the wireless relay apparatuses which can be found by the finding unit with information displayed by the displaying unit from an external apparatus which is connected with the network through the finding unit.

8. A computer-readable storage medium for use on a network-connectable device through a wireless relay apparatus, the computer-readable medium having computer-executable instructions for performing a method comprising:

finding the wireless relay apparatus;

counting a finding frequency of the found wireless relay apparatus;

detecting identification information of the found wireless relay apparatus;

storing specific image data indicating characters representing identification information of the found wireless relay apparatus; and displaying one of characters indicated by the stored image data and representing a character of the identification information on the found wireless relay apparatus in a display form which is in accordance with the counted finding frequency.

9. The computer-readable storage medium according to claim 8, wherein the storing includes storing the specific image data indicating characters and corresponding identification information of the wireless relay apparatuses.

10. The computer-readable storage medium according to claim 8, wherein the displaying includes displaying selectable information in accordance with the identification information on the found wireless relay apparatus, and setting connection environment using the found wireless relay apparatus when the displayed selectable information is selected.

\* \* \* \* \*